United States Patent
Rey et al.

(10) Patent No.: US 10,804,957 B1
(45) Date of Patent: Oct. 13, 2020

(54) PREAMBLE DETECTION DURING ACQUISITION

(71) Applicant: NXP USA, Inc., Austin, TX (US)

(72) Inventors: Claudio Gustavo Rey, Chandler, AZ (US); Raja Venkatesh Tamma, Cedar Park, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/407,638

(22) Filed: May 9, 2019

(51) Int. Cl.
| | |
|---|---|
| H03K 5/159 | (2006.01) |
| H04B 1/709 | (2011.01) |
| H04B 1/717 | (2011.01) |
| H04L 7/04 | (2006.01) |
| H04L 27/00 | (2006.01) |
| H04L 27/36 | (2006.01) |

(52) U.S. Cl.
CPC ............ H04B 1/709 (2013.01); H04B 1/717 (2013.01); H04L 7/046 (2013.01); H04L 27/0014 (2013.01); H04L 27/364 (2013.01); H04L 2027/0057 (2013.01); H04L 2027/0095 (2013.01)

(58) Field of Classification Search
CPC ............ H04L 27/2675; H04L 27/2655; H04L 27/2613; H04L 27/2656; H04L 27/0014; H04L 2027/0024; H04L 2027/0016; H04L 27/2647; H04L 49/9057; H04L 2012/5652; H04L 29/06136; H04L 69/166; H04B 17/20; H04B 1/30
See application file for complete search history.

(56) References Cited

U.S. PATENT DOCUMENTS

| | | |
|---|---|---|
| 7,003,063 B2 | 2/2006 | Mill |
| 7,035,352 B1 | 4/2006 | Malone et al. |
| 9,246,669 B2 | 1/2016 | Khan et al. |
| 9,479,288 B2 | 10/2016 | Waheed et al. |
| 9,794,056 B1 | 10/2017 | Tamma et al. |
| 2018/0159658 A1 | 6/2018 | de Ruijter et al. |
| 2019/0081834 A1 | 3/2019 | de Ruijter et al. |

FOREIGN PATENT DOCUMENTS

| | | |
|---|---|---|
| CN | 108683625 A | 10/2018 |
| EP | 2959591 A1 | 8/2014 |
| EP | 3185500 A1 | 6/2017 |
| JP | 5606411 B2 | 10/2014 |

*Primary Examiner* — Jung Liu

(57) ABSTRACT

A preamble detection system and method includes converting the phase domain input samples corresponding to the preamble into frequency domain input samples. An I/Q-formatted dot product is generated from a dot product process between the frequency domain input samples and a reference pattern indicative of an expected preamble. The I/Q-formatted dot product is averaged with at least one previously generated I/Q-formatted dot product to generate an I/Q-formatted averaged dot product. The I/Q-formatted averaged dot product is converted into a polar-formatted averaged dot product, wherein the polar-formatted averaged dot product includes a magnitude of the polar-formatted averaged dot product and an angle of the polar-formatted averaged dot product. A preamble-found signal is then generated in response to the magnitude of the polar-formatted averaged dot product exceeding a preamble magnitude threshold.

20 Claims, 8 Drawing Sheets

PREAMBLE DETECTION DURING ACQUISITION

TECHNICAL FIELD

This disclosure relates generally to frame detection, and more specifically to preamble detection of frequency shift keying (FSK) signals.

BACKGROUND OF THE DISCLOSURE

Deployment of Internet of Things (IoT) relies on networks of low-cost wireless devices that work reliably in the presence of interference. IoT standards include, for example, IEEE standard 802.15.1 (used by Bluetooth low energy (BLE)). BLE uses 2-level GFSK modulation, a modulation index of 0.5 and a BT of 0.5. A preamble may be used for symbol timing and frequency acquisition. Some preambles of longer length may consume more power during the identification of the preamble. Techniques that reduce power consumption for identifying packets with longer preambles without generating false detect signals are important as several protocols receivers spend a significant amount of time searching for signals.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

It should be understood that the figures are merely schematic and are not drawn to scale. It should also be understood that the same reference numerals may be used throughout the figures to indicate the same or similar parts.

DETAILED DESCRIPTION

Figure 1:
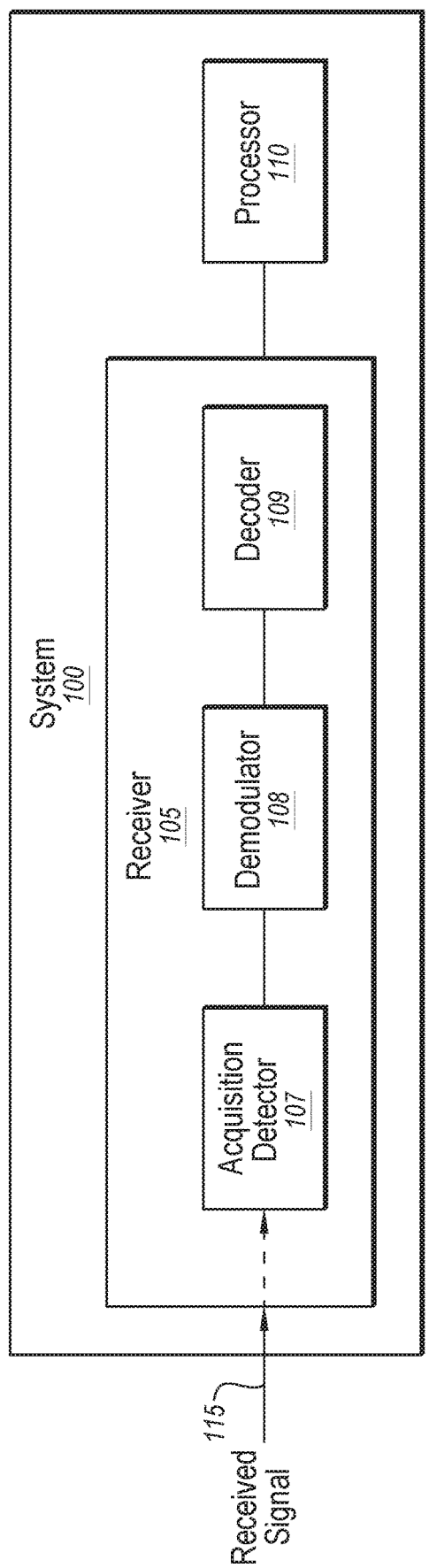
FIG. 1 illustrates a block diagram of a communication system, including an acquisition detector, for receiving digital data, in accordance with embodiments described herein.

A method and system for preamble detection for minimum shift keying (MSK) signals, frequency shift keying (FSK) signals, and Gaussian FSK (GSK) signals may be very flexible in terms of handling up to very large modulation indexes and very long preamble sequences while keeping complexity low is disclosed. The method and system may be based on conversion from a frequency modulation (FM) domain to an in-phase/quadrature (I/Q) domain.

The method and system may use IIR filtering to forward-average the correlation against a reference waveform. The method and system may have detection peak optimization to reduce the chance of detection happening too soon, and may also have signal level estimation and thresholding to reduce 'falsing' on noise. The method and system may also have the capability of fractional timing estimation and a limited range of frequency offset estimation.

The disclosed embodiments include a preamble detector configured with an averaging circuit, such as an infinite impulse response (IIR) filter, configured to forward-average the preamble correlation. Such an implementation may result in early packet detection and may also find application in antenna diversity configurations. In the disclosed embodiments, the preamble detection may be performed in the FM domain with the signal then converted back to the IQ domain.

The disclosed embodiments may include input signal power estimation and thresholding to avoid falsing on noise. Further, the disclosed embodiments may include peak optimization to reduce a repeated declaration of finding a preamble. Yet further, the timeout for identifying a preamble and asserting a preamble-found signal may be extended during the occurrence of continued high preamble correlation. Additionally, symbol timing and frequency offset may be estimated resulting in a synch pattern search that does not require multiple parallel searches for a frequency offset hypothesis.

The disclosed embodiments may utilize "virtual symbol repetition" to increase the symbol rate so that ratio between the "virtual symbol rate" and the deviation is made smaller. Generally, basic measurements are performed over a minimum preamble repetition pattern. Further, the result is forward-averaged with an IIR filter using shifts and additions.

Yet further, the disclosed embodiments observe low falsing (i.e., false positive detections) of the preamble-found signal because of correlation with a minimum received power requirement and other conditions including input signal peak optimization. The peak optimization may be performed by allowing a preamble detector to wait to see a peak in the input signal before announcing that a preamble was found. Further, the peaks may be confirmed by comparing against neighboring values plus non-adjacent specific future values, although the confirming may slightly delay the start of the sync pattern detection.

The disclosed embodiments also support long preambles. The best result is to have a long correlation if the incoming preamble signal is known to contain many symbols. However, this may be computationally very intensive and unacceptable. Instead the IIR filter makes up for this providing a virtual lengthening of the correlation. After a preamble detection, the frame delimiter synch pattern search begins to locate the beginning of the packet payload. However, the frame delimiter synch pattern search times-out after a pre-programmed duration if a synch pattern was not detected. Another feature of the embodiment is that if a preamble is detected and a minimum threshold is exceeded, the frame delimiter synch pattern detection is not allowed to timeout.

The disclosed embodiments further support pseudo FM correlation. Generally, the input signal may be converted into the phase domain, and then differentiated and converted back to the phase or IQ domain for correlation against a known reference pattern. Such an approach does not require frequency correction prior to correlation. Further, the phase of the correlation result indicates the frequency offset.

It should be appreciated that the disclosed techniques may be employed with various modulation schemes (e.g., phase-shift keying (PSK) modulation schemes, frequency shift keying (FSK) and their variations). Advantageously, the disclosed techniques tend to reduce packet loss and, as such, reduce re-transmissions, reduce required transmission power, and increase throughput and coverage.

The disclosed techniques may be implemented in hardware (e.g., in an application specific integrated circuit (ASIC) or a field-programmable gate array (FPGA)) or using a combination of hardware and software (e.g., using a programmed general purpose processor or a programmed digital signal processor (DSP)) which may be identified as a circuit, module, or the like. It should also be appreciated that the disclosed techniques are not limited to FSK demodulation. In general, the disclosed techniques are broadly applicable to time domain synchronization using repeated preamble samples. As stated, the disclosed techniques are also applicable to various modulations techniques, e.g., FSK, GFSK, MSK, GMSK and/or O-QPSK/DSSS modulation techniques.

FIG. 1 illustrates a communication system 100 which may include a receiver 105 and other components, such as a transmitter (not shown). Receiver 105 couples to a processor 110. The processor 110 may be, for example, an ASIC or FPGA or a programmed general purpose processor or a programmed DSP. The receiver 105 includes, for example, an acquisition detector 107, a demodulator 108, and a decoder 109 and may include other components (not shown). The acquisition detector 107 may be coupled to the demodulator 108, which is coupled to the decoder 109. The demodulator 108 may be, for example, a discriminator based demodulator.

The acquisition detector 107 may be configured to perform frequency domain synchronization of packets according to the present disclosure. More specifically, the acquisition detector 107 may be configured to employ frequency domain correlation and classify correlation output samples as valid preamble or an invalid preamble patterns. The demodulator 108 may, for example, be configured to generate bit log-likelihood ratios (LLRs) for received samples. The decoder 109, which may, for example, be implemented as a Viterbi decoder, functions to decode received samples. It should be appreciated that components of the receiver 105 that are not deemed desirable for understanding the disclosed subject matter have been omitted for the sake of brevity.

Receiver 105 may be used in a low cost IoT network and may comply with one or more of several standards relevant to IoT such as an IEEE 802.15.4 standard, or the Bluetooth Low Energy (BLE) standard. Receiver 105 may include front-end circuitry (not shown) such as mixers, oscillators, amplifiers, analog-to-digital converters (ADC), and filters. The received signal includes input samples that may be mixed with a local oscillator signal to produce in-phase (I) and quadrature (Q) components. The I and Q signals may then follow two paths, which are commonly illustrated as input samples 115. Receiver 105 may also include correction digital circuitry to correct analog impairments, such as I/Q imbalance correction or gain adjustments. Such circuits are known to those skilled in the art and are not further described herein.

Figure 2:
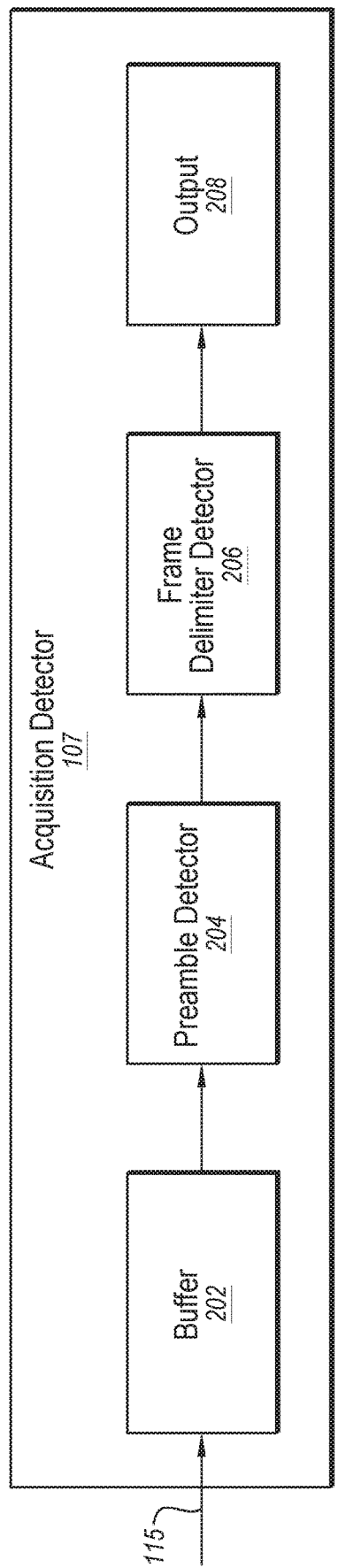
FIG. 2 illustrates a block diagram of an acquisition detector, including a preamble detector, in accordance with embodiments described herein.

FIG. 2 illustrates exemplary components that may be employed in the acquisition detector 207, which may correspond to the acquisition detector 107 of FIG. 1. As is shown, the acquisition detector 207 includes a buffer circuit 202 (e.g., including one or more circular buffers) that stores samples of a received input signal. A preamble detector 204 accesses samples from the buffer circuit 202 and performs operations, as described below with reference to at least FIG. 3, on the samples to determine whether a valid preamble pattern can be detected.

Upon preamble symbol detection, frame delimiter detector 206 performs operations to determine whether a valid frame delimiter can be detected. When frame synchronization is achieved, output circuit 208 may assert various flags (e.g., a frame synchronization flag (FRAME_SYNC_FLAG)) and provide applicable frame timing information (e.g., in the form of a FRAME_TIMING signal). At this point preamble search is disabled until after the full packet has been received.

Preamble detectors, such as preamble detector 204, examine phase relationships to determine a detection. The embodiments disclosed herein utilize a frequency domain analysis for identifying the presence of a preamble. A frequency modulation (FM) preamble search method is resistant to frequency offset in the incoming data, otherwise, 1) a concurrent frequency domain estimation may need to be performed or 2) multiple parallel preamble detectors may be needed at several frequency offset candidates.

Figure 3:
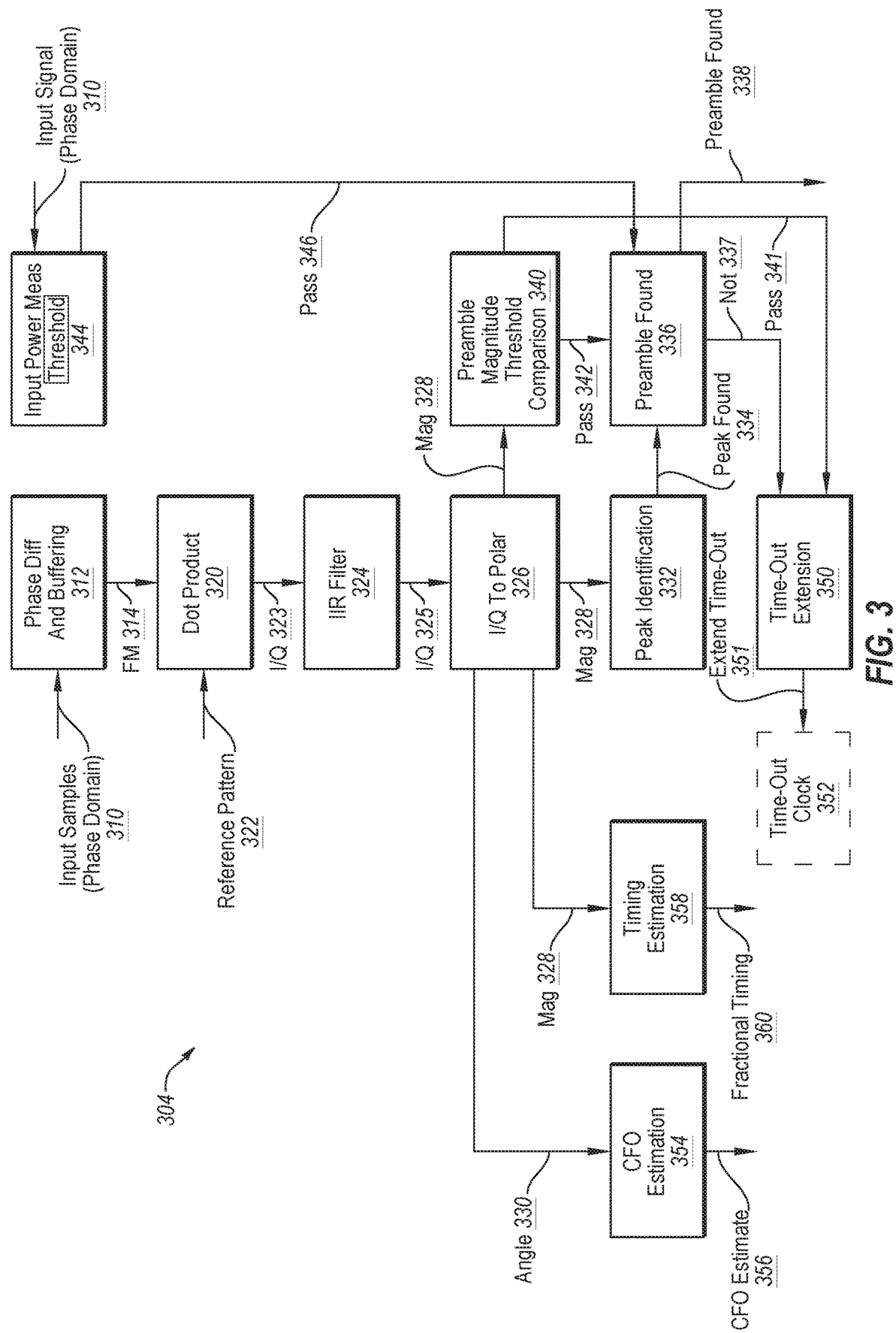
FIG. 3 illustrates a block diagram of a preamble detector, in accordance with embodiments described herein.

FIG. 3 illustrates a block diagram of a preamble detector 304, corresponding to the preamble detector 204 of FIG. 2. The preamble detector 304 receives an input signal in the form of phase domain input samples 310. The phase domain input samples 310 represent in-phase (I) and quadrature phase (Q) (I/Q) signals that have been formed from a radio frequency (RF) signal received at an antenna (not shown), split and provided to mixers (not shown), where the received input signal may be mixed with a local oscillator signal to produce the in-phase (I) and quadrature (Q) components of the phase domain input samples 310 in the phase domain. The I and Q components may also be amplified (not shown) and converted to digital signals using analog-to-digital converters (not shown). Further, the I and Q components may be down-converted to baseband and provided as the phase domain input samples 310.

The preamble detector 304 further includes a phase differentiator and buffering circuit 312 configured to receive the phase domain input samples 310. The phase differentiator and buffering circuit 312 converts the phase domain input samples 310 into frequency domain input samples 314. The conversion may be performed by differentiating the phase-based signal to result in a frequency-based signal.

The preamble detector 304 further includes a dot product circuit 320 configured to receive the frequency domain input samples 314 and perform the dot product operation (with a reference waveform) to generate an I/Q-formatted dot product 323. The dot product circuit 320 performs the dot product operation using the frequency domain input samples 314 and a reference pattern 322. It should be noted that the frequency domain input samples 314 includes a plurality of values, but the resulting I/Q-formatted dot product 323 is a scalar value.

The preamble detector 304 further includes an averaging circuit 324, which may be configured as an infinite impulse response (IIR) filter. The averaging circuit 324 may be configured to forward-average the I/Q-formatted dot product 323 with previously generated I/Q-formatted dot products and generate an I/Q-formatted averaged dot product 325. The averaging circuit 324 may be software configurable to accommodate different averaging durations. Further, the averaging may occur over data that are two symbols apart due to the repetitive nature of the preamble. Note that in a preferred embodiment the oversampling rate for the processing is four so data two symbols apart are nominally 8 samples apart. Other oversampling rates can be 2 and 8 and as such they are covered by this disclosure as simple extensions by those that are skilled in the art.

The preamble detector 304 further includes a timeout extension circuit 350 configured to reset a timeout clock 352 or extend a timeout to allow additional time to perform a frame delimiter search. The timeout may be extended based upon various conditions or combinations of conditions including the receipt of an input power sufficient signal 346 designating the received input samples exceed an input power level threshold as determined by an input power measurement circuit 344.

The preamble detector 304 further includes an I/Q-to-polar conversion circuit 326 which is configured to receive the I/Q-formatted averaged dot product 325 and to convert the I/Q-formatted averaged dot product 325 into polar values including a magnitude 328 of the polar-formatted averaged dot product and an angle 330 of the polar-formatted averaged dot product.

The preamble detector 304 further includes a peak identification circuit 332 configured to receive the magnitude 328 of the polar-formatted averaged dot product and perform a peak search operation, as further illustrated below with respect to FIG. 8, to generate a peak-found signal 334. The peak identification circuit 332 may perform a peak search operation by comparing a peak magnitude P to a previous peak magnitude Pm, and when the subsequent value increases, then the peak has not been reached. However, when the peak search operation results in a subsequent value Pp decrease, then the previous value P is designated as the peak and the peak-found signal 334 may be asserted.

The preamble detector 304 further includes a preamble-found circuit 336 which receives the peak-found signal 334 and generates a preamble-found signal 338. The preamble-found signal 338 identifies a correlation with a known synchronization pattern. In one embodiment, the preamble-found signal 338 may be in response to the peak-found signal 334. In other embodiments, the preamble-found signal 338 may be generated based on further inputs as further described herein.

The preamble detector 304 may further include a threshold comparison circuit 340. The threshold comparison circuit 340 may be configured to receive the magnitude 328 of the polar-formatted dot averaged product as generated by the I/Q-to-polar reformatting circuit 326. When the magnitude 328 exceeds a threshold as determined by the I/Q-to-polar reformatting circuit 326, the preamble magnitude threshold comparison circuit 340 generates a threshold exceeded signal 342. The threshold exceeded signal 342 couples to the preamble-found circuit 336 and may be used in one or more embodiments by the preamble-found circuit 336 as in input or condition for the generation of the preamble-found signal 338.

The preamble detector 304 may further include a timeout extension circuit 350. The extend timeout signal 351 causes the preamble detector 304 to continue searching for a preamble in the phase domain input samples 310. The timeout extension circuit 350 may be configured to generate an extend timeout signal 351 to continue the search for the frame delimiter in the message packet. The extend timeout signal 351 may be generated based on a preamble not found signal 337 generated by the preamble-found circuit 336. The extend timeout signal 351 may also be generated based on a threshold exceeded signal 341 generated by the preamble magnitude threshold comparison circuit 340.

The preamble detector 304 may further include an input power measurement circuit 344 configured to measure the phase domain input samples 310 against a threshold. The phase domain input samples 310 may be the same signal as presented to the phase differentiator and buffering circuit 312. The input power measurement circuit 344 may generate an input power sufficient signal 346 for use by the preamble-found circuit 336 to use in combination with other signals for the generation of the preamble-found signal 338.

The preamble detector 304 may further include a carrier frequency offset (CFO) estimation circuit 354 configured to receive the angle 330 of the polar-formatted averaged dot product and generate a CFO estimate 356. Further, a timing estimation circuit 358 may be configured to generate a fractional timing estimate 360 of the communication packet based in part on the magnitude of the polar-formatted averaged dot product.

Figure 4:
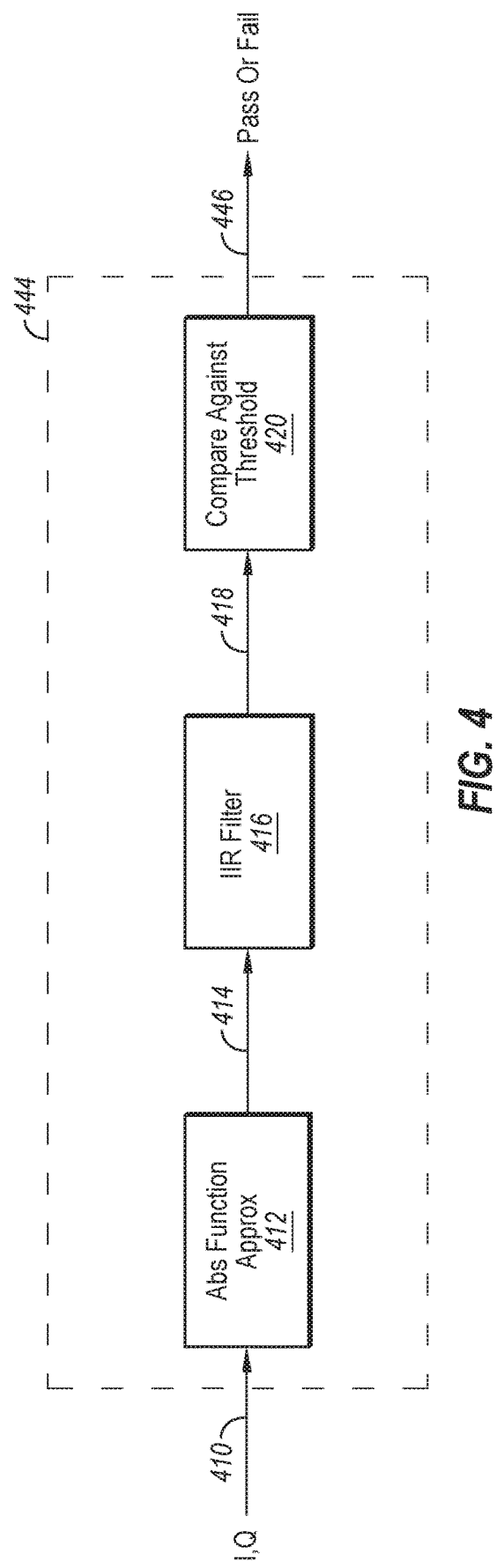
FIG. 4 illustrates a block diagram of an input power measurement circuit, in accordance with embodiments described herein.

FIG. 4 illustrates a detailed block diagram of an input power measurement circuit 444, and may correspond to the input power measurement circuit 344 of FIG. 3. The input power measurement circuit 444 receives phase domain input samples 410, which may correspond to phase domain input samples 310 of FIG. 3, and generates input power sufficient signal 446, which may correspond to the input power sufficient signal 346 of FIG. 3.

The input power measurement circuit 444 further includes an absolute value circuit 412 which receives the phase domain input samples 410 and performs an absolute value approximation on the phase domain input samples 410 and generates an approximate absolute value signal 414. The approximation utilizes an equation that may be more computationally efficient, and thereby power efficient, than other computations that may result in an unnecessarily more precise absolute value of the phase domain input samples 410. By way of example, the absolute value circuit 412 may perform the following function:

$$\text{abs} \sim = \tfrac{3}{8} * \min(|I|,|Q|) + \max(|I|,|Q|).$$

The input power measurement circuit 444 may further include an infinite impulse response (IIR) filter 416 which receives the approximate absolute value signal 414, averages the magnitudes to look for a constant component, and generates a filtered signal 418. The IIR filter 416 may be configured with various transfer functions, an example of which may be the following function:

$$H(z) = 2^{-n}/(1-(1-2-n)z^{-1}).$$

The input power measurement circuit 444 may further include a threshold comparison circuit 420 which receives and compares the filtered signal 418 against a threshold to generate the input power sufficient signal 446 which may indicate a pass or fail value.

Figure 5:
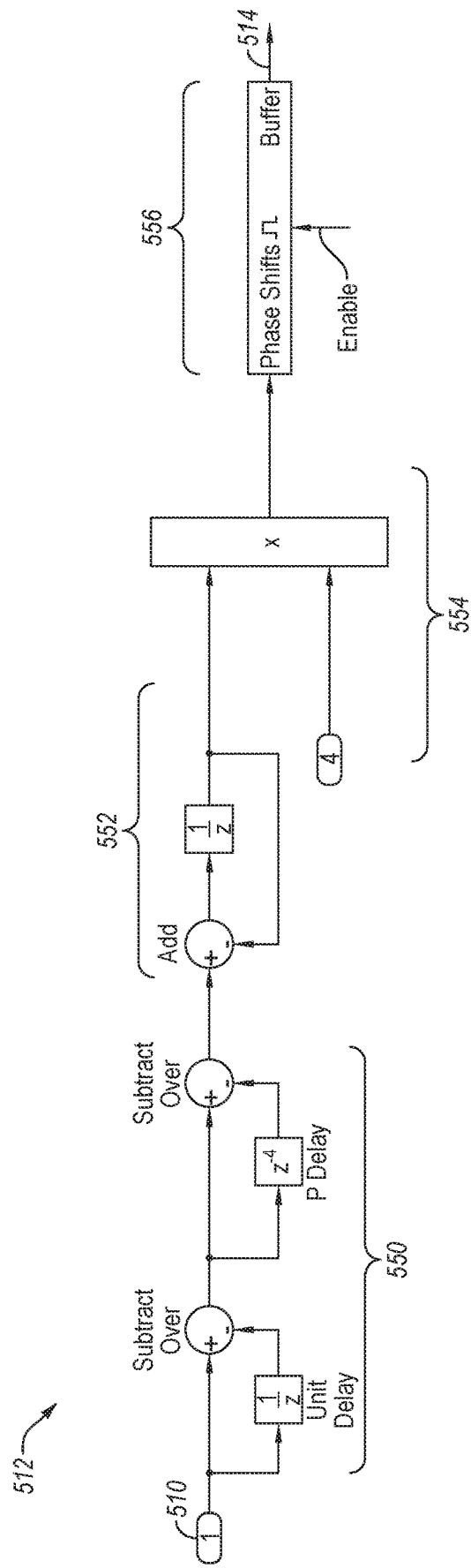
FIG. 5 illustrates a block diagram of a phase differentiator and buffering circuit, in accordance with embodiments described herein.

FIG. 5 illustrates a detailed block diagram of a phase differentiator and buffering circuit 512, and may correspond to the phase differentiator and buffering circuit 312 of FIG. 3. The phase differentiator and buffering circuit 512 converts a phase domain signal into an FM domain signal. Specifically, the phase differentiator and buffering circuit 512 receives phase domain input samples 510, which may correspond to the phase domain input samples 310 of FIG. 3, and generates frequency domain input samples 514, which may correspond to the frequency domain input samples 314 of FIG. 3. A circuit 550 accommodates an oversample rate of, for example, four, which corresponds to four samples per symbol. Other numbers of samples per symbol are also contemplated. The circuit 550 performs a subtraction function and performs a mathematical subtraction with the signaled delayed four samples (the oversampling factor). Note that a possible embodiment of this disclosure may have a different oversampling factor such as 2 or 8 then this delay must be changed accordingly this should be obvious to those skilled in the art.

A circuit 552 performs a combining function and is equivalent to performing a differentiation for each pair of symbols. The combination of circuit 550 and circuit 552 performs a difference between the current symbol and the previous symbol. A circuit 554 provides scaling by a modulation index to the resultant value. The circuit 554 supports various modulation indexes, an example of which may be 0.5/h where h may be one for BLE. A circuit 556 provides buffering, the length of which is based on the selected length of the length of a selected FFT for the dot product circuit 320 of FIG. 3.

Figure 6:
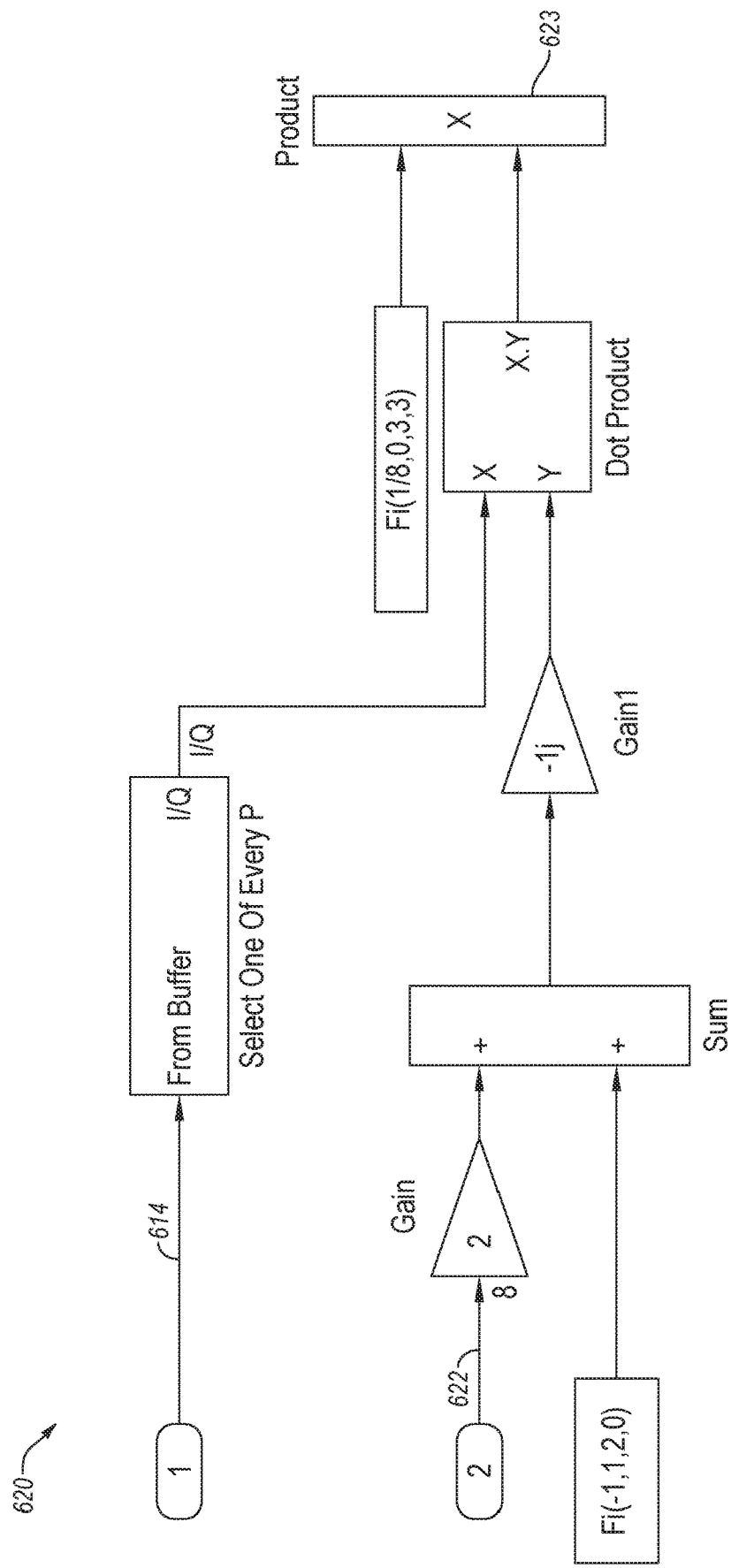
FIG. 6 illustrates a block diagram of a dot product circuit, in accordance with embodiments described herein.

FIG. 6 illustrates a detailed block diagram of a dot product circuit 620, and may correspond to the dot product circuit 320 of FIG. 3. The dot product circuit 620 may be configured to receive frequency domain input samples 614, which may correspond to the frequency domain input samples 314 of FIG. 3. The dot product circuit 620 performs the dot product operation to generate an I/Q-formatted dot product 623, which may correspond to the I/Q-formatted dot product 323 of FIG. 3. The dot product circuit 620 performs the dot product operation using the frequency domain input samples 614 and a reference pattern 622, which may correspond to the reference pattern 322 of FIG. 3. It should be noted that the resulting I/Q-formatted dot product 623 is a scalar value.

Further, the dot product circuit 620 performs the dot product on an FM domain input signal and results in an I/Q-formatted output signal. Also, and by way of example, a buffer of 32 samples, where one of every four samples in a total of eight sample values being used for the dot product, is compared against the reference pattern. Note that a possible embodiment of this disclosure may have a different oversampling factor such as 2 or 8 then this delay must be changed accordingly. Also, the search pattern may be one octet of the preamble pattern with repetition. An example of repetition by two of the bit patterns 01010101 or 10101010 results in the respective bit patterns of 00110011 or 11001100. Similarly, a repetition by four results in the bit patterns 00001111 or 11110000. As stated, the dot product circuit 620 further performs an FM to I/Q conversion on the signal.

Figure 7:
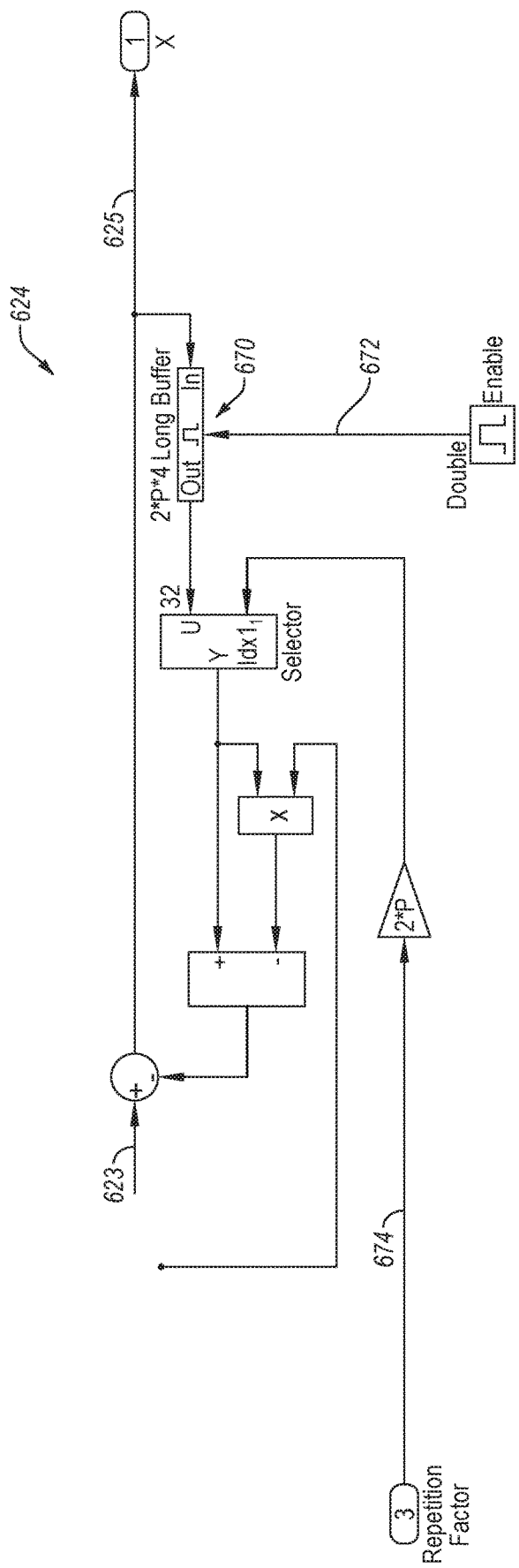
FIG. 7 illustrates a block diagram of an averaging circuit, in accordance with embodiments described herein.

FIG. 7 illustrates a detailed block diagram of an averaging circuit 624, configured as an infinite impulse response (IIR) filter, and may correspond to the averaging circuit 324 of FIG. 3 also configured as an IIR filter. The averaging circuit 624 performs the operation of forward-averaging the results from the dot product process to allow for a programmable averaging amount.

The averaging circuit 624 receives an I/Q-formatted dot product 623, which may correspond to the I/Q-formatted dot product 323 of FIG. 3, and generates an I/Q-formatted averaged dot product 625, which may correspond to the I/Q-formatted averaged dot product 325 of FIG. 3. The averaging occurs over data that are two symbols apart due to the repetitive nature of the preamble pattern. The averaging circuit 624 may be configured to accommodate repetition as described above by including additional buffering 670, as configured by repetition control signals 672 and 674.

Figure 8:
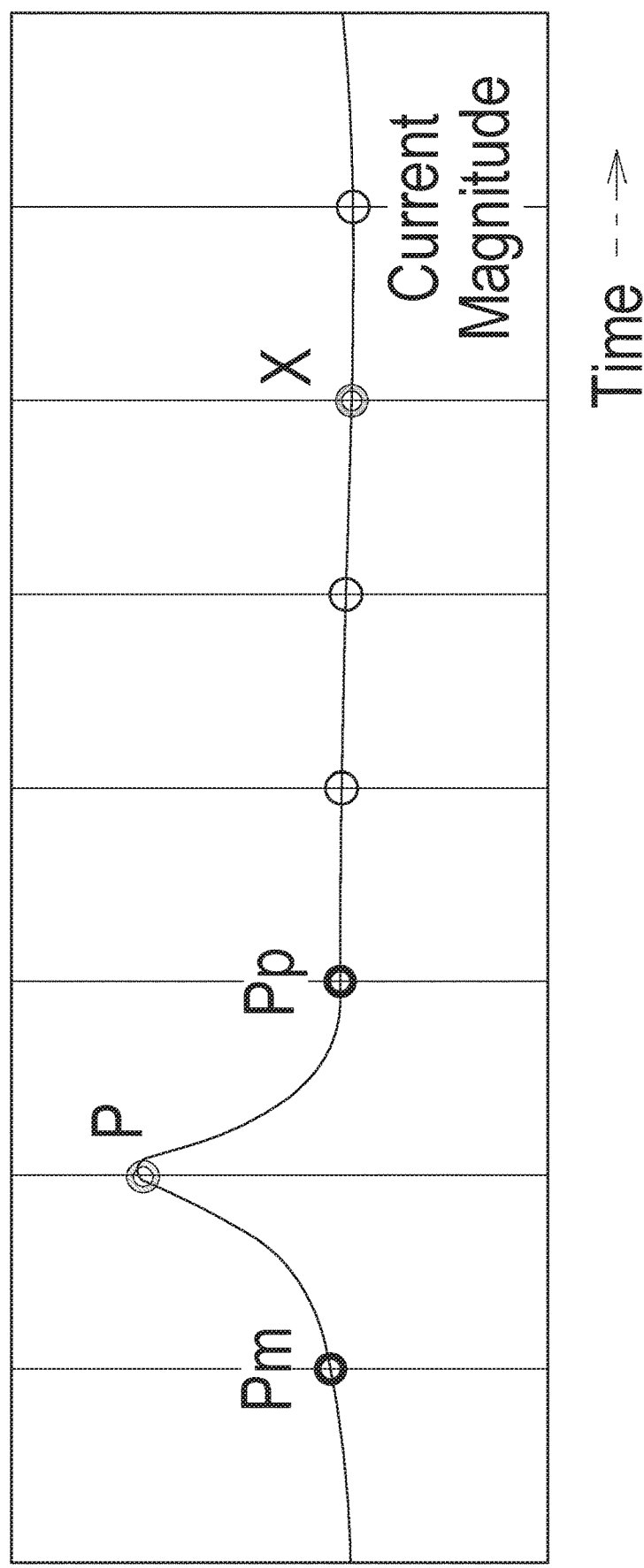
FIG. 8 illustrates a plot of the operation of a peak identification circuit, in accordance with embodiments described herein.

FIG. 8 illustrates a plot of the functioning of the peak identification circuit 332 of FIG. 3. The peak identification circuit 332 may generate a plot 800 in the performance of a peak search operation by comparing a peak magnitude P to a previous peak magnitude Pm, and when the subsequent value increases, then the peak has not been reached. However, when the peak search operation results in a subsequent value Pp decrease, then the previous value P is designated as the peak and the peak-found signal 334 is asserted.

The peak-found signal 334 may be one of several signals that contribute to the generation of the preamble-found signal 338. In one embodiment, the preamble-found signal 338 may be based in part on the input power of phase domain input samples 310 being greater than a threshold as determined in the input power measurement circuit 344. The preamble-found signal 338 may also be based in part on a determination that the local peak P occurred a sample earlier (i.e., P>Pm). The preamble-found signal 338 may also be based in part on a determination that a local peak no longer takes place a symbol ago (i.e., Pp<=P).

The preamble-found signal 338 may be based in part on the peak signal P being greater than a threshold as determined in the preamble magnitude threshold comparison circuit 340, resulting in the generation of signal 342. Further, the preamble-found signal 338 may also be based in part on a determination that the data value a sample ago is smaller than the peak (i.e., X<=P). Accordingly, the determination of the preamble-found signal 338, in one embodiment, may have a latency of five samples. This is exactly one symbol oversampled by 4 plus one sample. The number may change in a trivial way if the data is oversampled differently as, for example, by 2 or by 8.

A preamble detection system and method has been disclosed. The system and method includes converting the phase domain input samples corresponding to the preamble into frequency domain input samples. An I/Q-formatted dot product may be generated from a dot product process between the frequency domain input samples and a reference pattern indicative of an expected preamble. The I/Q-formatted dot product may be averaged with at least one previously generated I/Q-formatted dot product to generate an I/Q-formatted averaged dot product.

The I/Q-formatted averaged dot product may be converted into a polar-formatted averaged dot product, wherein the polar-formatted averaged dot product includes a magnitude of the polar-formatted averaged dot product and an angle of the polar-formatted averaged dot product. A preamble-found signal may be generated in response to the magnitude of the polar-formatted averaged dot product exceeding a preamble magnitude threshold.

In one embodiment, a method further includes receiving a communication packet including phase domain input samples which include a preamble and a frame delimiter. The phase domain input samples corresponding to the preamble are converted into frequency domain input samples. An I/Q-formatted dot product may be generated from a dot product process between the frequency domain input samples and a reference pattern indicative of an expected preamble.

The I/Q-formatted dot product is averaged with at least one previously generated I/Q-formatted dot product to generate an I/Q-formatted averaged dot product. The I/Q-formatted averaged dot product may be converted into a polar-formatted averaged dot product, wherein the polar-formatted averaged dot product includes a magnitude of the polar-formatted averaged dot product and an angle of the polar-formatted averaged dot product. A preamble-found signal may be generated in response to the magnitude of the polar-formatted averaged dot product exceeding a preamble magnitude threshold.

In other embodiments, the averaging the I/Q-formatted dot product may include infinite impulse response (IIR) filtering the I/Q-formatted dot product with the at least one previously generated I/Q-formatted dot product to generate the I/Q-formatted averaged dot product. Further, generating the preamble-found signal may include identifying a peak in the magnitude of the polar-formatted averaged dot product, generating a peak-found signal in response to the identifying the peak, and generating the preamble-found signal based in part on the peak-found signal.

The generating the preamble-found signal may further include asserting an input power sufficient signal based on a comparison of a power level of the phase domain input samples with a lower power threshold, and when the input power sufficient signal is asserted, generating the preamble-found signal based in part on the input power sufficient signal. Yet further, the generating a preamble-found signal in response to the magnitude of the polar-formatted averaged dot product exceeding a preamble magnitude threshold may further include extending a delimiter detection timeout clock to continue delimiter detection in the communication packet.

The method may further include extending a delimiter detection timeout clock to continue delimiter detection in the communication packet when the polar-formatted averaged dot product does not exceed a preamble magnitude threshold and the preamble-found signal is not generated. Further features of the method may include generating a carrier frequency offset (CFO) estimate based in part on the angle of the polar-formatted dot product, and generating a fractional timing estimate of the communication packet based in part on the magnitude of the polar-formatted dot product.

In another embodiment, a preamble detector includes a phase differentiator and buffering circuit, a dot product circuit, an averaging circuit, an I/Q-to-polar reformatting circuit, and a preamble-found circuit. The phase differentiator and buffering circuit may be configured to receive a communication packet including phase domain input samples including a preamble, and to convert the phase domain input samples corresponding to the preamble into frequency domain input samples.

The dot product circuit may be configured to generate an I/Q-formatted dot product from a dot product process between the frequency domain input samples and a reference pattern indicative of an expected preamble. The averaging circuit may be configured to average the I/Q-formatted dot product with at least one previously generated I/Q-formatted dot product to generate an I/Q-formatted averaged dot product.

The I/Q-to-polar reformatting circuit may be configured to reformat the I/Q-formatted averaged dot product into a polar-formatted averaged dot product, wherein the polar-formatted averaged dot product may include a magnitude of the polar-formatted averaged dot product and an angle of the polar-formatted averaged dot product. The preamble-found circuit may be configured to generate a preamble-found signal in response to the magnitude of the polar-formatted averaged dot product exceeding a preamble magnitude threshold.

The averaging circuit may be an infinite impulse response (IIR) filter configured to filter the I/Q-formatted dot product with the at least one previously generated I/Q-formatted dot product to generate the I/Q-formatted averaged dot product. Further, the preamble detector may include a peak identification circuit configured to identify a peak in the magnitude of the polar-formatted averaged dot product, and to generate a peak-found signal when a peak is identified. The preamble-found circuit may be further configured to generate the preamble-found signal based in part on the peak-found signal.

The preamble detector may further include an input power measurement circuit configured to assert an input power sufficient signal based on a comparison of a power level of the phase domain input samples with a power threshold, and when the input power sufficient signal is asserted, the preamble-found circuit may be further configured to generate the preamble-found signal based in part on the input power sufficient signal.

The preamble detector may further include a timeout extension circuit configured to generate an extend timeout signal to extend timing to continue delimiter detection in the communication packet when the input power sufficient signal is asserted. Further, the timeout extension circuit may be further configured to generate the extend timeout signal to extend timing to continue delimiter detection in the communication packet when the preamble-found circuit does not generate the preamble-found signal.

The preamble detector may further include a carrier frequency offset (CFO) estimation circuit configured to generate a CFO estimate based in part on the angle of the polar-formatted averaged dot product. Also, the preamble detector may further include a timing estimation circuit configured to generate a fractional timing estimate of the communication packet based in part on the magnitude of the polar-formatted averaged dot product.

In yet another embodiment, a method includes receiving a communication packet including phase domain input samples which include a preamble and a frame delimiter. The method includes receiving in-phase and quadrature-phase (I/Q) formatted frequency domain input samples configured as a preamble in a communication packet. An I/Q-formatted dot product may be generated from the I/Q-formatted frequency domain input samples and a reference pattern indicative of an expected preamble. The I/Q-formatted dot product may be averaged with at least one previously generated I/Q-formatted dot product to generate an I/Q-formatted averaged dot product. A preamble-found signal may be generated based on a magnitude of the I/Q-formatted averaged dot product.

The preamble-found signal may be further based on one or more of a peak in the magnitude of the I/Q-formatted averaged dot product, and a comparison of a power level of the preamble in the communication packet. The averaging the I/Q-formatted dot product may include infinite impulse response (IIR) filtering the I/Q-formatted dot product with the at least one previously generated I/Q-formatted dot product to generate the I/Q-formatted averaged dot product. The method may also include generating a carrier frequency offset (CFO) estimate based in part on an angle of the I/Q-formatted averaged dot product.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions.

Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Values such as maximum or minimum may be predetermined and set to different values based on the application.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

The invention claimed is:

1. A method, comprising:
    receiving a communication packet including phase domain input samples including a preamble and a frame delimiter;
    converting the phase domain input samples corresponding to the preamble into frequency domain input samples;
    generating an I/Q-formatted dot product from a dot product process between the frequency domain input samples and a reference pattern indicative of an expected preamble;
    averaging the I/Q-formatted dot product with at least one previously generated I/Q-formatted dot product to generate an I/Q-formatted averaged dot product;
    reformatting the I/Q-formatted averaged dot product into a polar-formatted averaged dot product, the polar-formatted averaged dot product including a magnitude of the polar-formatted averaged dot product and an angle of the polar-formatted averaged dot product; and
    generating a preamble-found signal in response to the magnitude of the polar-formatted averaged dot product exceeding a preamble magnitude threshold.

2. The method of claim 1, wherein the averaging the I/Q-formatted dot product comprises infinite impulse response (IIR) filtering the I/Q-formatted dot product with the at least one previously generated I/Q-formatted dot product to generate the I/Q-formatted averaged dot product.

3. The method of claim 1, wherein the generating the preamble-found signal further comprises:
    identifying a peak in the magnitude of the polar-formatted averaged dot product;
    generating a peak-found signal in response to the identifying the peak; and
    generating the preamble-found signal based in part on the peak-found signal.

4. The method of claim 1, wherein the generating the preamble-found signal further comprises:
    asserting an input power sufficient signal based on a comparison of a power level of the phase domain input samples with a lower power threshold; and
    when the input power sufficient signal is asserted, generating the preamble-found signal based in part on the input power sufficient signal.

5. The method of claim 1, wherein the generating a preamble-found signal in response to the magnitude of the polar-formatted averaged dot product exceeding a preamble magnitude threshold further comprises:
    extending a delimiter detection timeout clock to continue delimiter detection in the communication packet.

6. The method of claim 1, further comprising:
    extending a delimiter detection timeout clock to continue delimiter detection in the communication packet when the polar-formatted averaged dot product does not exceed a preamble magnitude threshold and the preamble-found signal is not generated.

7. The method of claim 1, further comprising:
    generating a carrier frequency offset (CFO) estimate based in part on the angle of the polar-formatted averaged dot product.

8. The method of claim 1, further comprising:
    generating a fractional timing estimate of the communication packet based in part on the magnitude of the polar-formatted averaged dot product.

9. A preamble detector, comprising:
    a phase differentiator and buffering circuit configured to receive a communication packet including phase domain input samples including a preamble, and to convert the phase domain input samples corresponding to the preamble into frequency domain input samples;
    a dot product circuit configured to generate an I/Q-formatted dot product from a dot product process between the frequency domain input samples and a reference pattern indicative of an expected preamble;
    an averaging circuit configured to average the I/Q-formatted dot product with at least one previously generated I/Q-formatted dot product to generate an I/Q-formatted averaged dot product;
    an I/Q-to-polar reformatting circuit configured to reformat the I/Q-formatted averaged dot product into a polar-formatted averaged dot product, the polar-formatted averaged dot product including a magnitude of the polar-formatted averaged dot product and an angle of the polar-formatted averaged dot product; and
    a preamble-found circuit configured to generate a preamble-found signal in response to the magnitude of the polar-formatted averaged dot product exceeding a preamble magnitude threshold.

10. The preamble detector of claim 9, wherein the averaging circuit is an infinite impulse response (IIR) filter configured to filter the I/Q-formatted dot product with the at least one previously generated I/Q-formatted dot product to generate the I/Q-formatted averaged dot product.

11. The preamble detector of claim 9, further comprising:
    a peak identification circuit configured to identify a peak in the magnitude of the polar-formatted averaged dot product, and to generate a peak-found signal when a peak is identified; and
    wherein the preamble-found circuit is further configured to generate the preamble-found signal based in part on the peak-found signal.

12. The preamble detector of claim 9, further comprising:
    an input power measurement circuit configured to assert an input power sufficient signal based on a comparison of a power level of the phase domain input samples with a power threshold; and
    when the input power sufficient signal is asserted, the preamble-found circuit is further configured to generate the preamble-found signal based in part on the input power sufficient signal.

13. The preamble detector of claim 12, further comprising:
    a timeout extension circuit configured to generate an extend timeout signal to extend timing to continue delimiter detection in the communication packet when the input power sufficient signal is asserted.

14. The preamble detector of claim 13, wherein the timeout extension circuit is further configured to generate the extend timeout signal to extend timing to continue delimiter detection in the communication packet when the preamble-found circuit does not generate the preamble-found signal.

15. The preamble detector of claim 9, further comprising:
a carrier frequency offset (CFO) estimation circuit configured to generate a CFO estimate based in part on the angle of the polar-formatted averaged dot product.

16. The preamble detector of claim 9, further comprising:
a timing estimation circuit configured to generate a fractional timing estimate of the communication packet based in part on the magnitude of the polar-formatted averaged dot product.

17. A method, comprising:
receiving in-phase and quadrature-phase (I/Q) formatted frequency domain input samples configured as a preamble in a communication packet;
generating an I/Q-formatted dot product from the I/Q-formatted frequency domain input samples and a reference pattern indicative of an expected preamble;
averaging the I/Q-formatted dot product with at least one previously generated I/Q-formatted dot product to generate an I/Q-formatted averaged dot product; and
generating a preamble-found signal based on a magnitude of the I/Q-formatted averaged dot product.

18. The method of claim 17, wherein the preamble-found signal is further based on one or more of a peak in the magnitude of the I/Q-formatted averaged dot product, and a comparison of a power level of the preamble in the communication packet.

19. The method of claim 17, wherein the averaging the I/Q-formatted dot product comprises infinite impulse response (IIR) filtering the I/Q-formatted dot product with the at least one previously generated I/Q-formatted dot product to generate the I/Q-formatted averaged dot product.

20. The method of claim 17, further comprising:
generating a carrier frequency offset (CFO) estimate based in part on an angle of the I/Q-formatted averaged dot product.

\* \* \* \* \*